United States Patent
Kawasaki et al.

(10) Patent No.: US 11,098,392 B2
(45) Date of Patent: *Aug. 24, 2021

(54) HOT ROLLED STEEL SHEET FOR COLD ROLLED STEEL SHEET, HOT ROLLED STEEL SHEET FOR GALVANIZED STEEL SHEET, AND METHOD FOR PRODUCING THE SAME

(71) Applicant: JFE Steel Corporation, Tokyo (JP)

(72) Inventors: Yoshiyasu Kawasaki, Chiba (JP); Shinjiro Kaneko, Chiba (JP); Yasunobu Nagataki, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 245 days.

This patent is subject to a terminal disclaimer.

(21) Appl. No.: 16/202,634

(22) Filed: Nov. 28, 2018

(65) Prior Publication Data

US 2019/0106773 A1 Apr. 11, 2019

Related U.S. Application Data

(62) Division of application No. 14/241,256, filed as application No. PCT/JP2012/005066 on Aug. 9, 2012, now abandoned.

(51) Int. Cl.
| | | |
|---|---|---|
| *C22C 38/18* | (2006.01) | |
| *C21D 8/02* | (2006.01) | |
| *C21D 9/46* | (2006.01) | |
| *C22C 38/06* | (2006.01) | |
| *C22C 38/58* | (2006.01) | |
| *C22C 38/00* | (2006.01) | |
| *C22C 38/02* | (2006.01) | |
| *C22C 38/04* | (2006.01) | |
| *C21D 6/00* | (2006.01) | |
| *C22C 38/08* | (2006.01) | |
| *C22C 38/12* | (2006.01) | |
| *C22C 38/14* | (2006.01) | |
| *C22C 38/16* | (2006.01) | |
| *B32B 15/01* | (2006.01) | |
| *C23C 2/02* | (2006.01) | |
| *C23C 2/06* | (2006.01) | |

(52) U.S. Cl.
CPC ............ *C22C 38/18* (2013.01); *B32B 15/013* (2013.01); *C21D 6/005* (2013.01); *C21D 8/02* (2013.01); *C21D 8/0263* (2013.01); *C21D 9/46* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/58* (2013.01); *C23C 2/02* (2013.01); *C23C 2/06* (2013.01)

(58) Field of Classification Search
CPC ... C22C 38/001; C22C 38/002; C22C 38/005; C22C 38/02; C22C 38/04; C22C 38/06; C22C 38/08; C22C 38/12; C22C 38/14; C22C 38/16; C22C 38/18; C22C 38/58; C21D 8/0263; C21D 8/02; C21D 6/005; C21D 9/46; C23C 2/02; C23C 2/06
See application file for complete search history.

(56) References Cited

U.S. PATENT DOCUMENTS

| | | | |
|---|---|---|---|
| 8,784,578 B2 | 7/2014 | Kawasaki et al. | |
| 8,951,366 B2* | 2/2015 | Sano | C22C 38/04 |
| | | | 148/320 |
| 8,968,494 B2 | 3/2015 | Nakagaito et al. | |
| 9,580,785 B2 | 2/2017 | Nakagaito et al. | |
| 10,174,396 B2* | 1/2019 | Takashima | C21D 8/0263 |
| 2004/0244877 A1 | 12/2004 | Yokoi et al. | |
| 2011/0171478 A1 | 7/2011 | Tang et al. | |
| 2012/0279617 A1 | 11/2012 | Kawasaki et al. | |
| 2019/0161822 A1* | 5/2019 | Takashima | C22C 38/00 |

FOREIGN PATENT DOCUMENTS

| | | |
|---|---|---|
| EP | 1001041 A1 | 5/2000 |
| EP | 1291447 A1 | 3/2003 |
| JP | 01240617 A | 9/1989 |
| JP | 02149646 A | 6/1990 |
| JP | 04276015 A | 10/1992 |
| JP | 06248340 A | 9/1994 |
| JP | 108188 A | 1/1996 |
| JP | 1036917 A | 2/1998 |

(Continued)

OTHER PUBLICATIONS

Nomura et al., JP-3823338-B2, machine translation (Year: 2006).*
Taiwanese Office Action for Taiwanese Application No. 101131316, dated Mar. 19, 2014, with Concise Statement of Relevance of Office Action—6 pages.
Extended European Search Report for European Application No. 12 828 162.3, dated Jul. 16, 2015—8 pages.
International Search Report and Written Opinion for Application No. PCT/JP2012/005066, dated Oct. 30, 2012—5 pages.
Entire patent prosecution history of U.S. Appl. No. 14/241,256, filed Feb. 26, 2014, entitled "Hot Rolled Steel Sheet for Cold Rolled Steel Sheet, Hot Rolled Steel Sheet for Galvanized Steel Sheet, and Method for Producing the Same."

(Continued)

*Primary Examiner* — John A Hevey

(74) *Attorney, Agent, or Firm* — RatnerPrestia

(57) ABSTRACT

A hot rolled steel sheet having a chemical composition containing, by mass %, C: 0.04% or more and 0.20% or less, Si: 0.7% or more and 2.3% or less, Mn: 0.8% or more and 2.8% or less, P: 0.1% or less, S: 0.01% or less, Al: 0.1% or less, N: 0.008% or less, and the balance being Fe and inevitable impurities. The microstructure of the hot rolled steel sheet includes ferrite and pearlites, in which the area ratio of the ferrite is 75% or more and less than 95%, the mean grain size of the ferrite is 5 μm or more and 25 μm or less, the area ratio of pearlite is 5% or more and less than 25%, the mean grain size of pearlite is 2.0 μm or more, and the mean free path of pearlite is 5 μm or more.

17 Claims, No Drawings

(56) References Cited

FOREIGN PATENT DOCUMENTS

| | | |
|---|---|---|
| JP | 2000212684 A | 8/2000 |
| JP | 2000290750 A | 10/2000 |
| JP | 3119122 B2 | 12/2000 |
| JP | 2002173738 A | 6/2002 |
| JP | 3823338 B2 * | 9/2006 ............... C21D 8/02 |
| JP | 38823338 B2 | 9/2006 |
| JP | 2007182625 A | 7/2007 |
| JP | 2010275600 A | 12/2010 |
| TW | 201042087 A | 12/2010 |
| TW | 201114921 A | 5/2011 |
| WO | 2011090182 A1 | 7/2011 |
| WO | 2011093319 A1 | 8/2011 |

OTHER PUBLICATIONS

Final Office Action for U.S. Appl. No. 15/115,138, dated Jul. 6, 2018, 7 pages.

* cited by examiner

HOT ROLLED STEEL SHEET FOR COLD ROLLED STEEL SHEET, HOT ROLLED STEEL SHEET FOR GALVANIZED STEEL SHEET, AND METHOD FOR PRODUCING THE SAME

CROSS REFERENCE TO RELATED APPLICATIONS

This is a Divisional application of U.S. patent application Ser. No. 14/241,256, filed Feb. 26, 2014, which is the U.S. National Phase application of PCT International Application No. PCT/JP2012/005066, filed Aug. 9, 2012, and claims priority to Japanese Patent Application No. 2011-188712, filed Aug. 31, 2011, the disclosures of each of these applications being incorporated herein by reference in their entireties for all purposes.

FIELD OF THE INVENTION

The present invention relates to a hot rolled steel sheet for a cold rolled steel sheet and a hot rolled steel sheet for a galvanized steel sheet excellent in terms of formability and stability of material quality which can be suitably applied to automobile parts and a method for producing the hot rolled steel sheets.

BACKGROUND OF THE INVENTION

Nowadays, an increase in fuel efficiency is strongly required in order to decrease the $CO_2$ emission of automobiles due to growing awareness of the need to conserve the global environment. Accordingly, there is a trend towards decreasing the weight of automobiles by increasing the strength of the material of automobile bodies in order to decrease the thickness of the material. However, there is a concern that there may be a decrease in ductility due to the increase in the strength of steel sheets. Therefore, the development of a high strength and high ductility steel sheet is desired. In addition, there is a significant decrease in shape fixability due to an increase in the strength of a steel sheet and a decrease in the thickness of a steel sheet. In order to solve this problem, it is common practice to design a mold for press forming in anticipation of the amount of deformation which is expected to occur after the release of a workpiece from the mold. However, in the case where the tensile strength (TS) of a steel sheet varies, a shape defect occurs due to the deviation of the amount of deformation from that which is expected for a constant tensile strength, and a readjustment such as sheet-metal working of each workpiece is necessary after press forming in order to correct the shape of the workpiece, which results in a significant decrease in volume efficiency. Therefore, it is necessary to control the variability of the TS of a steel sheet to be as small as possible.

In order to increase the ductility of a high strength cold rolled steel sheet and a high strength galvanized steel sheet, various kinds of high strength steel sheets having a combined microstructure such as ferrite-martensite dual-phase steel and TRIP steel, which utilizes the transformation induced plasticity of retained austenite, have been developed.

For example, Patent Literature 1 discloses a steel sheet excellent in terms of ductility which can be used for a high strength cold rolled steel sheet and a high strength galvanized steel sheet, in which a chemical composition and the volume fractions of ferrite, bainitic ferrite, and retained austenite phases are specified. Patent Literature 2 discloses a method for producing a high strength cold rolled steel sheet, in which the variability of elongation in the width direction of the steel sheet is decreased. In addition, in the case of a hot rolled steel sheet, Patent Literatures 3, 4, and 5 disclose methods for producing high strength hot rolled steel sheets, in which cooling conditions in a hot rolling process are specified.

PATENT LITERATURE

PTL 1: Japanese Unexamined Patent Application Publication No. 2007-182625
PTL 2: Japanese Unexamined Patent Application Publication No. 2000-212684
PTL 3: Japanese Patent No. 3119122
PTL 4: Japanese Patent No. 3823338
PTL 5: Japanese Unexamined Patent Application Publication No. 10-36917

SUMMARY OF THE INVENTION

Since the main object of the Patent Literature 1 is to increase the ductility of a high strength steel sheet, stability of material quality is not considered. In addition, since only the variability of total elongation (EL) in the width direction is mentioned in Patent Literature 2, the variability of material quality due to a chemical composition and producing conditions is not considered. Moreover, in any of Patent Literatures 1 and 2 described above, microstructure control at the hot rolling stage is not considered, and an increase in ductility and a decrease in the variability of ductility in the width direction have been intended by microstructure control after cold rolling. In addition, in Patent Literatures 3, 4, and 5, methods for producing hot rolled steel sheets excellent in terms of stretch flangeability are disclosed, but a hot rolled material to be used for producing a cold steel sheet or a hot rolled material to be used for producing a galvanized steel sheet is not considered. Therefore, there is a desire for the development of a hot rolled steel sheet for a cold rolled steel sheet and a hot rolled steel sheet for a galvanized steel sheet which are excellent in terms of formability and stability of material quality.

In view of the situation described above, the present invention aims to provide a hot rolled steel sheet having a TS of 540 MPa or more which can be used for producing a cold rolled steel sheet and a galvanized steel sheet excellent in terms of formability and stability of material quality and a method for producing the hot rolled steel sheet.

The present inventors diligently conducted investigations in order to obtain a hot rolled material for producing a cold rolled steel sheet and a galvanized steel sheet having a TS of 540 MPa or more and excellent in terms of formability and stability of material quality, and, as a result, found the following facts.

The control of a microstructure of the hot rolled steel sheet in which the variability of material quality is small has been aimed at by forming a microstructure mainly including ferrite and pearlite at the coiling stage in a hot rolling process so as to suppress the change of the microstructure due to transformation in the following cooling process. Moreover, the sufficient strength, an increase in the ductility of a cold rolled steel sheet and a galvanized steel sheet and a decrease in the variability of the material quality (the stability of material quality) of a cold rolled steel sheet and a galvanized steel sheet after the following annealing have been aimed at by controlling a thermal history from a finish rolling delivery temperature to a coiling temperature, in particular, a cooling rate, so as to form the microstructure of the steel sheet mainly include ferrite and pearlite and so as to control the mean grain sizes and the area ratios of the ferrite and pearlite and the dispersion state (mean free path) of the pearlite. As a result, the production of a hot rolled steel sheet for a cold rolled steel sheet and a hot rolled steel sheet for a galvanized steel sheet excellent in terms of formability and stability of material quality has become possible.

The present invention has been completed on the basis of the knowledge described above and includes the following characteristics.

[1] A hot rolled steel sheet for a cold rolled steel sheet, the hot rolled steel sheet having a chemical composition containing, by mass %, C: 0.04% or more and 0.20% or less, Si: 0.7% or more and 2.3% or less, Mn: 0.8% or more and 2.8% or less, P: 0.1% or less, S: 0.01% or less, Al: 0.1% or less, N: 0.008% or less, and the balance being Fe and inevitable impurities, and a microstructure of the hot rolled steel sheet including ferrite and pearlite, in which the area ratio of the ferrite is 75% or more and less than 95%, the mean grain size of the ferrite is 5 μm or more and 25 μm or less, the area ratio of the pearlite is 5% or more and less than 25%, the mean grain size of the pearlite is 2.0 μm or more, and the mean free path of the pearlite is 5 μm or more.

[2] The hot rolled steel sheet for a cold rolled steel sheet according to item [1], in which a difference in tensile strength between a portion at the center of the width of the hot rolled steel sheet and a position located at ⅛ of the sheet width from the edge in the width direction of the hot rolled steel sheet, is 30 MPa or less.

[3] The hot rolled steel sheet for a cold rolled steel sheet according to item [1], further containing, by mass %, at least one element selected from the group consisting of Cr: 0.05% or more and 1.0% or less, V: 0.005% or more and 0.5% or less, Mo: 0.005% or more and 0.5% or less, Ni: 0.05% or more and 1.0% or less, and Cu: 0.05% or more and 1.0% or less.

[4] The hot rolled steel sheet for a cold rolled steel sheet according to item [1] or [3], further containing, by mass %, at least one element selected from the group consisting of Ti: 0.01% or more and 0.1% or less, Nb: 0.01% or more and 0.1% or less, and B: 0.0003% or more and 0.0050% or less.

[5] The hot rolled steel sheet for a cold rolled steel sheet according to item [1] or [3], further containing, by mass %, at least one element selected from the group consisting of Ca: 0.001% or more and 0.005% or less and REM: 0.001% or more and 0.005% or less.

[6] The hot rolled steel sheet for a cold rolled steel sheet according to item [4], further containing, by mass %, at least one element selected from the group consisting of Ca: 0.001% or more and 0.005% or less and REM: 0.001% or more and 0.005% or less.

[7] A hot rolled steel sheet for a galvanized steel sheet, the hot rolled steel sheet having a chemical composition containing, by mass %, C: 0.04% or more and 0.20% or less, Si: 0.7% or more and 2.3% or less, Mn: 0.8% or more and 2.3% or less, P: 0.1% or less, S: 0.01% or less, Al: 0.1% or less, N: 0.008% or less, and the balance being Fe and inevitable impurities, and a microstructure of the hot rolled steel sheet including ferrite and pearlite, in which the area ratio of the ferrite is 75% or more and less than 95%, the mean grain size of the ferrite is 5 μm or more and 25 μm or less, the area ratio of the pearlite is 5% or more and less than 25%, the mean grain size of the pearlite is 2.0 μm or more, and the mean free path of the pearlite is 5 μm or more.

[8] The hot rolled steel sheet for a galvanized steel sheet according to item [7], in which a difference in tensile strength between a portion at the center of the width of the hot rolled steel sheet, and a position located at ⅛ of the sheet width from the edge in the width direction of the hot rolled steel sheet is 30 MPa or less.

[9] The hot rolled steel sheet for a galvanized steel sheet according to item [7], further containing, by mass %, at least one element selected from the group consisting of Cr: 0.05% or more and 1.0% or less, V: 0.005% or more and 0.5% or less, Mo: 0.005% or more and 0.5% or less, Ni: 0.05% or more and 1.0% or less, and Cu: 0.05% or more and 1.0% or less.

[10] The hot rolled steel sheet for a galvanized steel sheet according to item [7] or [9], further containing, by mass %, at least one element selected from the group consisting of Ti: 0.01% or more and 0.1% or less, Nb: 0.01% or more and 0.1% or less and B: 0.0003% or more and 0.0050% or less.

[11] The hot rolled steel sheet for a galvanized steel sheet according to item [7] or [9], further containing, by mass %, at least one element selected from the group consisting of Ca: 0.001% or more and 0.005% or less and REM: 0.001% or more and 0.005% or less.

[12] The hot rolled steel sheet for a galvanized steel sheet according to item [11], further containing, by mass %, at least one element selected from the group consisting of Ca: 0.001% or more and 0.005% or less and REM: 0.001% or more and 0.005% or less.

[13] A method for producing a hot rolled steel sheet for a cold rolled steel sheet, the method including:

hot rolling a steel slab having a chemical composition containing, by mass %, C: 0.04% or more and 0.20% or less, Si: 0.7% or more and 2.3% or less, Mn: 0.8% or more and 2.8% or less, P: 0.1% or less, S: 0.01% or less, Al: 0.1% or less, N: 0.008% or less, and the balance being Fe and inevitable impurities under the condition that a finish rolling delivery temperature is 850° C. or higher;

cooling the hot rolled steel sheet at a mean cooling rate of 20° C./s to 90° C./s in a temperature range from the finish rolling delivery temperature to 650° C.;

further cooling the hot rolled steel sheet at a mean cooling rate of 5° C./s to 35° C./s in a temperature range down to a coiling temperature; and coiling the cooled steel sheet at a temperature of 470° C. to 640° C.

[14] The method for producing a hot rolled steel sheet for a cold rolled steel sheet according to item [13], wherein the steel slab further contains, by mass %, at least one element selected from the group consisting of Cr: 0.05%, or more and 1.0% or less, V: 0.005% or more and 0.5% or less. Mo: 0.005% or more and 0.5% or less, Ni: 0.05% or more and 1.0% or less, and Cu: 0.05% or more and 1.0% or less.

[15] The method for producing a hot rolled steel sheet for a cold rolled steel sheet according to item [13] or [14], wherein the steel slab further contains, by mass %, at least one element selected from the group consisting of Ti: 0.01% or more and 0.1% or less, Nb: 0.01% or more and 0.1% or less, and B: 0.0003% or more and 0.0050% or less.

[16] The method for producing a hot rolled steel sheet for a cold rolled steel sheet according to item [13] or [14], wherein the steel slab further contains, by mass %, at least one element selected from the group consisting of Ca: 0.001% or more and 0.005% or less and REM: 0.001% or more and 0.005% or less.

[17] The method for producing a hot rolled steel sheet for a cold rolled steel sheet according to item [15], wherein the steel slab further contains, by mass %, at least one element selected from the group consisting of Ca: 0.001% or more and 0.005% or less and REM: 0.001% or more and 0.005% or less.

[18] A method for producing a hot rolled steel sheet for a galvanized steel sheet, the method including:

hot rolling a steel slab having a chemical composition containing, by mass %, C: 0.04% or more and 0.20% or less, Si: 0.7% or more and 2.3% or less, Mn: 0.8% or more and 2.8% or less, P: 0.1% or less, S: 0.01% or less, Al: 0.1% or less, N: 0.008% or less, and the balance being Fe and inevitable impurities under the condition that a finish rolling delivery temperature is 850° C. or higher, cooling the hot rolled steel sheet at a mean cooling rate of 20° C./s to 90° C./s in a temperature range from the finish rolling delivery temperature to 650° C., further cooling the hot rolled steel sheet at a mean cooling rate of 5° C./s to 35° C./s in a temperature range down to a coiling temperature, and coiling the cooled steel sheet at a temperature of 470° C. to 640° C.

[19] The method for producing a hot rolled steel sheet for a galvanized steel sheet according to item [18], wherein the steel slab further contains, by mass %, at least one element selected the group consisting of Cr: 0.05% or more and 1.0% or less, V: 0.005% or more and 0.5% or less, Mo: 0.005% or more and 0.5% or less, Ni: 0.05% or more and 1.0% or less, and Cu: 0.05% or more and 1.0% or less.

[20] The method for producing a hot rolled steel sheet for a galvanized steel sheet according to item [18] or [19], wherein the steel slab further contains, by mass %, at least one element selected from the group consisting of Ti: 0.01% or more and 0.1% or less, Nb: 0.01% or more and 0.1% or less, and B: 0.0003% or more and 0.0050% or less.

[21] The method for producing a hot rolled steel sheet for a galvanized steel sheet according to item [18] or [19], wherein the steel slab further contains, by mass %, at least one element selected from the group consisting of Ca: 0.001% or more and 0.005% or less and REM: 0.001% or more and 0.005% or less.

[22] The method for producing a hot rolled steel sheet for a galvanized steel sheet according to item [20], wherein the steel slab further contains, by mass %, at least one element selected from the group consisting of Ca: 0.001% or more and 0.005% or less and REM: 0.001% or more and 0.005% or less.

Here, % used when describing a chemical composition of steel always represents mass % in the present specification.

In addition, in the present invention, "a galvanized steel sheet" collectively means a steel sheet which is coated with zinc by a galvanizing method regardless of whether or not the steel sheet is subjected to an alloying treatment after galvanizing has been performed. That is to say, galvanized steel sheets according to the present invention include both a galvanized steel, sheet (GI) which is not subjected to an alloying treatment and a galvannealed steel sheet (GA) which is subjected to an alloying treatment. In addition, in the present invention, hot rolled steel sheets for cold rolled steel sheets and hot rolled steel sheets for galvanized steel sheets include both cut steel sheets and coiled steel sheets (strips).

According to the present invention, a hot rolled steel sheet for a cold rolled steel sheet and a hot rolled steel sheet for a galvanized steel sheet excellent in terms of formability and stability of material quality can be obtained. Since a cold steel sheet and a galvanized steel sheet which are produced from the hot rolled steel sheet according to the present invention preferably have a TS of 540 MPa or more and are excellent in terms of formability and stability of material quality, an increase in fuel efficiency due to a decrease in the weight of automobile bodies can be realized by applying the steel sheets to, for example, the structural parts of automobiles.

DETAILED DESCRIPTION OF EMBODIMENTS OF THE INVENTION

Exemplary embodiments of the present invention will be described in detail hereafter.

By appropriately controlling the mean grain sizes and the mean area ratios of ferrite and pearlite of a microstructure of the hot rolled steel sheet, it has become possible to achieve good ductility after the following annealing has been performed. Moreover, it has been found that, by controlling the thermal history in hot rolling so as to control the mean grain size of ferrite and the mean grain size and the mean free path of pearlite in a microstructure of the hot rolled steel sheet, a microstructure of the hot rolled steel sheet in which pearlite is dispersed sparsely can be formed. Accordingly, the further increase in ductility and the further decrease in the variability of material quality (increase in stability of material quality) of a cold rolled steel sheet and a galvanized steel sheet which are produced by performing an annealing treatment afterward (hereinafter, a steel sheet which has been subjected to an annealing treatment will be also called "an annealed steel sheet") can be achieved. That is to say, by considering microstructure control at the hot rolling stage, it has become possible to manufacture a cold rolled steel sheet and a galvanized steel sheet excellent in terms of formability and stability of material quality.

The facts described above are the technological characteristics which have been used to complete the present invention.

A chemical composition contains, by mass %, C: 0.04% or more and 0.20% or less, Si: 0.7% or more and 2.3% or less, Mn: 0.8% or more and 2.8% or less, P: 0.1% or less, S: 0.01% or less, Al: 0.1% or less, N: 0.008% or less, and the balance being Fe and inevitable impurities, and a microstructure of the hot rolled steel sheet includes ferrite and pearlite, in which the area ratio of the ferrite is 75% or more and less than 95%, the mean grain size of the ferrite is 5 μm or more and 25 μm or less, the area ratio of the pearlite is 5% or more and less than 25%, the mean grain size of the pearlite is 2.0 μm or more, and the mean free path of the pearlite is 5 μm or more.

(1) First, a chemical composition will be described.

C: 0.04% or More and 0.20% or Less

C is an element which is effective for forming an austenite phase and for increasing strength and ductility by forming a combined microstructure after annealing has been performed. In the case where the C content is less than 0.04%, it is difficult to obtain an annealed steel sheet with a sufficient strength. On the other hand, in the case where the C content is more than 0.20% excessively, mechanical properties of a welded part deteriorate due to a significant increase in the hardness of the welded part and heat affected zone, which results in a decrease in performances such as spot welding performance and arc welding performance. Therefore, the C content is set to be 0.04% or more and 0.20% or less, preferably 0.05% or more and 0.14% or less, more preferably 0.07% or more and 0.12% or less.

Si: 0.7% or More and 2.3% or Less

Si is an element which is effective for forming a ferrite, for solid solution strengthening of the ferrite of an annealed steel sheet, and for increasing the ductility of an annealed steel sheet. It is necessary that the Si content be 0.7% or more in order to improve the balance between the strength and ductility of an annealed steel sheet. In addition, Si is an element which is necessary to increase the stability of material quality, because Si promotes ferrite transformation at the hot rolling stage, which results in securing the desired mean grain size and area ratio of ferrite. However, in the case where the Si content is more than 2.3% excessively, red scale or the like occurs, which results in the deterioration of surface quality and the wettability and adhesiveness of coating. Therefore, the Si content is set to be 0.7% or more and 2.3% or less, preferably 0.9% or more and 2.0% or less, more preferably more than 1.2% and 2.0% or less.

Mn: 0.3% or More and 2.8% or Less

Mn is an element which is effective for forming an austenite phase and for securing a strength of an annealed steel sheet. It is difficult to secure the strength in the case where the Mn content is less than 0.8%. On the other hand in the case where the Mn content is more than 2.8% excessively ferrite transformation and pearlite transformation are delayed in hot rolling, which makes it difficult to obtain a desired mean grain size and area ratio of ferrite, resulting in a concern that there may be a decrease in the stability of material quality. In addition, since the alloying cost of Mn is increasing nowadays, excessively high Mn content causes an increase in cost. Therefore, the Mn content is set to be 0.8% or more and 2.8% or less, preferably 1.2% or more and 2.8% or less.

P: 0.1% or Less

Although P is an element which is effective for increasing the strength of steel, embrittlement due to grain boundary segregation is caused in the case where the P content is more than 0.1% excessively, which results in a decrease in impact resistance. In addition, alloying speed of a galvanized coating layer is significantly delayed in the case where the P content is more than 0.1%. Therefore, the P content is set to be 0.1% or less, preferably 0.02% or less. In addition, since P is an element which is effective for solid solution strengthening and may be added depending on a desired strength, it is preferable that the P content be 0.005% or more.

S: 0.01% or Less

Since S causes a decrease in impact resistance and a crack along the metal flow in a welded part as a result of forming inclusions such as MnS, it is preferable that the S content be as small as possible. The S content is set to be 0.01% or less from the viewpoint of producing cost, preferably 0.005% or less.

Al: 0.1% or Less

Since excessively high Al content causes a decrease in surface quality and formability due to an increase in oxide inclusions and an increase in cost, the Al content is set to be 0.1% or less, preferably 0.05% or less. In addition, since Al is an element which is effective for forming ferrite and improving the balance between strength and ductility, it is preferable that the Al content be 0.01% or more.

N: 0.008% or Less

Since N is the element which most significantly decreases the aging resistance of steel, it is preferable that the N content be as small as possible, and there is a significant decrease in aging resistance in the case where the N content is more than 0.008%. Therefore, the N content is set to be 0.008% or less, preferably 0.004% or less.

The remainder of the chemical composition consists of Fe and inevitable impurities. However, the alloying elements described below may be added as needed in addition to the composition described above.

At least one selected from the group consisting of Cr: 0.05% or more and 1.0% or less, V: 0.005% or more and 0.5% or less, Mo: 0.005% or more and 0.5% or less, Ni: 0.05% or more and 1.0% or less, and Cu: 0.05% or more and 1.0% or less Since Cr, V, Mo, Ni, and Cu are elements which are effective for increasing the strength of steel, these elements may be added so as to increase the strength of steel as long as the contents of these elements are within the limitations according to the present invention. The effect for increasing the strength of steel can be realized in the case where the Cr content is 0.05% or more, the V content is 0.005% or more, the Mo content is 0.005% or more, the Ni content is 0.05% or more, or the Cu content is 0.05% or more. However, in the case where the Cr content is more than 1.0%, the V content is more than 0.5%, the Mo content is more than 0.5%, the Ni content is more than 1.0%, or the Cu content is more than 1.0%, the fraction of retained raicrostructures (described below) such as martensite becomes excessively large, which causes a concern that there may be a decrease in ductility due to a significant increase in strength. In addition, the excessively high contents of these elements cause an increase in cost. Therefore, in the case where these elements are added, the Cr content is set to be 0.05% or more and 1.0% or less, the V content is set to be 0.005% or more and 0.5% or less, the Mo content is set to be 0.005% or more and 0.5% or less, the Ni content is set to be 0.05% or more and 1.0% or less, and the Cu content is set to be 0.05% or more and 1.0% or less.

At least one selected from the group consisting of Ti: 0.01% or more and 0.1% or less, Nb: 0.01% or more and 0.1% or less, and B: 0.0003% or more and 0.0050% or less Ti and Nb are elements which are effective for precipitation strengthening of steel. This effect is realized in the case where the Ti content is 0.01% or more, or the Nb content is 0.01% or more. However, in the case where the Ti content is more than 0.1% or the Nb content is more than 0.1% excessively, the fraction of retained microstructures such as a martensite becomes excessively large, which causes a concern that there may be a decrease in ductility due to a significant increase in strength, and which results in an increase in cost. Therefore, in the case where Ti or Nb is added, the Ti content is set to be 0.01% or more and 0.1% or less, or the Nb content is set to be 0.01% or more and 0.1% or less.

B is an element which is effective for increasing the strength of steel, and this effect is realized in the case where the B content is 0.0003% or more. However, in the case where the B content is more than 0.0050% excessively, the fraction of retained microstructures such as martensite becomes excessively large, which causes a concern that there may be a decrease in ductility due to a significant increase in strength. In addition, excessively high B content causes an increase in cost. Therefore, in the case where B is added, the B content is set to be 0.0003% or more and 0.0050% or less.

At least one selected from the group consisting of Ca: 0.001% or more and 0.005% or less and REM: 0.001% or more and 0.005% or less Ca and REM are elements which are effective for decreasing the negative effect of sulfides on local ductility as a result of spheroidizing the shape of the sulfides. In order to realize this effect, it is necessary that the Ca content be 0.001% or more, or the REM content be 0.001% or more. However, in the case where the Ca content or the REM content is more than 0.005%, there is an increase in the amount of inclusions, which results in the occurrence of defects on the surface and the inside of a steel sheet. Therefore, in the case where Ca or REM is added, the Ca content is set to be 0.001% or more and 0.005% or less, or the REM content is set to be 0.001% or more and 0.005% or less.

(2) Secondly, a microstructure will be described.

The area ratio of ferrite of a microstructure of the hot rolled steel sheet: 75% or more and less than 95%

In order to obtain an annealed steel sheet with good ductility, it is necessary that the area ratio of ferrite of a microstructure of the hot rolled steel sheet be 75% or more, more preferably 78% or more. In addition, in order to obtain an annealed steel sheet with a sufficient strength, it Is necessary the area ratio of ferrite of a microstructure of the hot rolled steel sheet be less than 95%.

The area ratio of pearlite of a microstructure of the hot rolled steel sheet: 5% or more and less than 25%

In order to obtain an annealed steel sheet with good ductility, it is necessary that the area ratio of pearlite of a microstructure of the hot rolled steel sheet be 5% or more, more preferably 8% or more. In addition, in order to obtain an annealed steel sheet with sufficient stability of material quality, it is necessary the area ratio of pearlite of a microstructure of the hot rolled steel sheet be less than 25%.

The mean grain size of ferrite of a microstructure of the hot rolled steel sheet: 5 µm or more and 25 µm or less In order to obtain an annealed steel sheet with good stability of material quality, it is necessary that the mean grain size of ferrite of a microstructure of the hot rolled steel sheet be 5 µm or more. In addition, in the case where the mean grain size of ferrite of the microstructure of the hot rolled steel sheet is more than 25 µm, it is difficult to obtain an annealed steel sheet with a desired strength. Therefore, it is necessary that the mean grain size of ferrite of a microstructure of the hot rolled steel sheet be 5 µm or more and 25 µm or less, preferably 8 µm or more and 20 µm or less.

The mean grain size of pearlite of a microstructure of the hot rolled steel sheet: 2.0 µm or more In order to obtain an annealed steel sheet with good ductility, it is necessary that the mean grain size of pearlite of a microstructure of the hot rolled steel sheet be 2.0 µm or more, preferably 3.0 µm or more and 10 µm or less.

The mean free path of pearlite of a microstructure of the hot rolled steel sheet: 5 µm or more In order to obtain an annealed steel sheet with good ductility and stability of material quality, it is necessary that the mean free path of pearlite of a microstructure of the hot rolled steel sheet be 5 µm or more, preferably 6 µm or more and 15 µm or less.

There is a case where, in addition to ferrite and pearlite, carbides such as a cementite and martensite, bainitic ferrite and retained austenite are formed as retained microstructures in a microstructure of the hot rolled steel sheet. It is preferable that the area ratio of these retained microstructures be 8% or less, and the effects of the present invention is not decreased as long as the area ratio is within this range. According to the present invention, it is possible to achieve benefits of the present invention, if the chemical composition of steel and the constitution of a metal microstructure (the area ratios and mean grain sizes of ferrite and pearlite and the mean free path of a pearlite) satisfy the requirement described above.

(3) A difference in tensile strength (absolute value) between a tensile strength in a portion at the center of the width of the hot rolled steel sheet and a tensile strength at a position located at ⅛ of the sheet width from the edge in the width direction of the hot rolled steel sheet: 30 MPa or less In order to realize a decrease in the variability of material quality in the width direction of an annealed steel sheet (increase in the stability of material quality), it is effective to stabilize the material quality in the width direction of a hot rolled steel sheet. From the viewpoint of the stabilization of the material quality of an annealed steel sheet, it is preferable that a difference (absolute value) in tensile strength between a portion at the center of the width of the hot rolled steel sheet and a position located at ⅛ of the sheet width from the edge (edge portion) in the width direction of the hot rolled steel sheet (hereinafter, also called "position at ⅛ of width") be 30 MPa or less.

In addition, it is more preferable that differences in yield stress (ΔYP) and total elongation (ΔEL) between a portion at the center of the width of the hot rolled steel sheet and a position located at ⅛ of the sheet width from the edge (edge portion) in the width direction of the hot rolled steel sheet be respectively 40 MPa or less and 4% or less from the viewpoint of stabilization of the material quality of an annealed steel sheet. The reason why the variability of material quality of the hot rolled steel sheet is evaluated at the two points, one of which is a portion at the center of the width of a hot rolled steel sheet and another is a position at ⅛ of width, is that, for example, in case where a difference in tensile strength between a portion at the center of the width of a hot rolled steel sheet and a position located at ¼ of the sheet width from the edge (edge portion) in the width direction of the hot rolled steel sheet (position at ¼ of width) is used, the material quality in the vicinity of the edge cannot be evaluated, accordingly, it is difficult to satisfactorily evaluate the stability of material quality in the width direction, but it is possible to appropriately evaluate the stability of the material quality of an annealed steel sheet by using a difference between a position located at ⅛ of the width, which is closer to the edge, and a portion at the center of the width.

(4) Subsequently, an embodiment of a method for producing the hot rolled steel sheet for a cold rolled steel sheet and the hot rolled steel sheet for a galvanized steel sheet according to embodiments of the present invention will be described.

The hot rolled steel sheet for a cold rolled steel sheet excellent in terms of formability and stability of material quality according to the present invention can be produced by hot rolling a steel slab having the chemical composition described above under the condition that a finish rolling delivery temperature is 850° C. or higher, by cooling the hot rolled steel, sheet at a mean cooling rate of 20° C./s to 90° C./s in a temperature range from the finish rolling delivery temperature to 650° C., by further cooling the hot rolled steel sheet at a mean cooling rate of 5° C./s to 35° C./s in a temperature range down to a coiling temperature, and by coiling the cooled steel sheet at a temperature of 470° C. to 640° C.

In addition, the hot rolled steel sheet for a galvanized steel sheet excellent in terms of formability and stability of material quality according to the present invention can be produced by hot rolling a steel slab having the chemical composition described above under the condition that a finish rolling delivery temperature is 850° C. or higher, by cooling the hot rolled steel sheet at a mean cooling rate of 20° C./s to 90° C./s in a temperature range from the finish rolling delivery temperature to 650° C., by further cooling the hot rolled steel sheet at a mean cooling rate of 5° C./s to 35° C./s in a temperature range down to a coiling temperature, and by coiling the cooled steel sheet at a temperature of 470° C. to 640° C.

Detailed description will be given hereafter.

Steel having a chemical composition described above is smelted by a well-known method, made into a slab by performing slabbing rolling or continuous casting, and made into a hot rolled steel sheet by performing hot rolling. Although there is no limitation on the heating conditions of the slab, it is preferable that the heating temperature be 1100° C. to 1300° C. Hot rolling is performed under the conditions described below.

A finish rolling delivery temperature: 850° C. or higher

In the case where the finish rolling delivery temperature is lower than 850° C., a microstructure, in which a ferrite is elongated in the rolling direction, is formed, which results in a decrease in the ductility and stability of the material of an annealed steel sheet. Therefore, the finish rolling delivery temperature is set to be 850° C. or higher, preferably 870° C. or higher.

Cooling at a mean cooling rate of 20° C./s to 90° C./s in a temperature range from the finish rolling delivery temperature to 650° C. (first cooling)

In the case where the mean cooling rate in a temperature range from the finish rolling delivery temperature to 650° C. is less than 20° C./s, ferrite transformation excessively progresses and a desired area ratio of a pearlite cannot be achieved, which results in a decrease in the ductility of an annealed steel sheet. In addition, in the case where the mean cooling rate is more than 90° C./s, ferrite transformation does not sufficiently progress in a microstructure of the hot rolled steel sheet and a desired mean grain size of ferrite and a desired mean free path of pearlite cannot be achieved, which results in a decrease in the ductility and stability of the material quality of an annealed steel sheet. Therefore, the mean cooling rate in a temperature range from the finish rolling delivery temperature to 650° C. is set to be 20° C./s to 90° C./s, preferably 30° C./s to 70° C./s.

Cooling at a mean cooling rate of 5° C./s to 35° C./s in a temperature range down to a coiling temperature (second cooling)

In the case where the mean cooling rate in a temperature range down to a coiling temperature after the first cooling has been finished is less than 5° C./s, ferrite transformation excessively progresses and a desired area ratio of a pearlite cannot be achieved, which results in a decrease in ductility. In addition, in the case where the mean cooling rate in a temperature range down to a coiling temperature after the first cooling has been finished is more than 35° C./s, bainite transformation progress after coiling has been finished, a desired area ratio and mean grain size of pearlite cannot be achieved, which results in a decrease in the ductility of an annealed steel sheet. Therefore, the mean cooling rate in a temperature range down to a coiling temperature is set to be 5° C./s to 35° C./s, preferably 10° C./s to 25° C./s.

Coiling Temperature: 470° C. to 640° C.

In the case where the cooing temperature is lower than 470° C., low-temperature transformation phases (hard phases) of martensite and bainite are contained in a large amount in a microstructure of the hot rolled steel sheet and a desired area ratio of a pearlite cannot be obtained, which results in a decrease in the stability of material quality of an annealed steel sheet due to the occurrence of uneven distribution of hardness in the width direction of the microstructure of the hot rolled steel sheet. In addition, in the case where the coiling temperature is higher than 640° C., there is an increase in the grain size of ferrite in a microstructure of the hot rolled steel sheet, it is difficult to achieve a desired strength of an annealed steel sheet. Therefore, the coiling temperature is set to be 470° C. to 640° C., preferably 480° C. to 620° C.

A cold rolled steel sheet is produced by pickling the hot rolled steel sheet obtained as described above by a commonly known method, optionally, as needed, by performing pretreatments such as degreasing, by cold rolling the pickled steel sheet, and by performing an annealing treatment on the cold rolled steel sheet. In addition, after the annealing treatment has been performed, a galvanized steel sheet is produced by performing a galvanizing treatment, and optionally, by further performing an alloying treatment. In addition, a galvanized steel, sheet may be produced, without performing cold rolling after pickling has been performed, by performing an annealing treatment, by performing a galvanizing treatment, and optionally, by further performing an alloying treatment. In the series of the heat treatments in the producing method according to the present invention, the steel sheet may be subjected to heat treatments in any kinds of equipment. It is preferable that cold rolling and an annealing treatment be performed under the conditions described below.

In the case where a cold rolling reduction ratio is less than 30%, the recrystallization of a ferrite is not promoted in an annealing treatment and non-recrystallized ferrite is retained, which may result in a decrease in the ductility of an annealed steel sheet. Therefore, it is preferable that the cold rolling reduction ratio be 30% or more. It is preferable that an annealing treatment is performed at a temperature of 750° C. to 900° C. for a duration time of 15 seconds to 600 seconds. This is because, in the case where the annealing temperature is lower than 750° C. or the duration time is less than 15 seconds with the annealing temperature of 750° C. to 900° C., non-recrystallized microstructure is retained, which may result in a decrease in ductility, and because, in the case where the annealing temperature is higher than 900° C. or the duration time is more than 600 seconds with the annealing temperature of 750° C. to 900° C., there is a significant growth of austenite grains, a non-uniform microstructure is finally formed, which may result in a decrease in the stability of material quality.

A steel sheet, may be subjected to skin pass rolling for the purposes of, for example, straightening the shape of the steel sheet after annealing has been performed in the case of a cold rolled steel sheet, after galvanizing has been performed in the case of a galvanized steel sheet (GI) which is not subjected to an alloying treatment, or after an alloying treatment has been performed in the case of an galvannealed steel sheet (GA).

EXAMPLES

Steels having the chemical compositions given in Table 1 with the balance being Fe and inevitable impurities were smelted in a revolving furnace and made into slabs by a continuous casting method. The obtained slabs were heated up to a temperature of 1200° C., subjected to hot rolling under the conditions that, the thicknesses of the hot rolled steel sheets were 2.3 to 4.5 mm and finish rolling delivery temperatures were those given in Table 2, subjected to cooling under the conditions given in Table 2, and coiled. Subsequently, the obtained hot rolled steel sheets were pickled, cold rolled and annealed at a temperature of 800° C., and, as needed, subjected to a galvanizing treatment, and optionally, further subjected to a alloying treatment of the galvanized layer so as to make cold rolled steel sheets (CR), galvanized steel sheets (GI), and galvannealed steel sheets (GA). Some of the hot rolled steel sheets were, without being cold rolled after pickling had been performed, subjected to annealing and galvanizing, and, optionally, further subjected to an alloying treatment of the galvanized layer so as to make galvanized steel sheets (GI) and galvannealed steel sheets (GA). A galvanizing bath having an Al content of 0.19 mass % was used for galvanized steel sheets (GI) and a galvanizing bath having an Al content of 0.14 mass % was used for galvannealed steel sheets (GA), where the bath temperature was 460° C. Galvannealed steel sheets (GA) were subjected to an alloying treatment at a temperature of 550° C. A coating weight was 45 g/m² per side (double-sided coating). The Fe content in the coating layer of galvannealed steel sheets (GA) was 9 mass % to 12 mass %.

TABLE 1

| Steel Grade | Chemical Composition (mass %) | | | | | | | | | | | | | | | | | Note |
|---|---|---|---|---|---|---|---|---|---|---|---|---|---|---|---|---|---|---|
| | C | Si | Mn | Al | P | S | N | Ni | Cu | Cr | V | Mo | Nb | Ti | B | Ca | REM | |
| A | 0.089 | 1.52 | 1.48 | 0.031 | 0.015 | 0.0018 | 0.0032 | — | — | — | — | — | — | — | — | — | — | Example |
| B | 0.082 | 1.16 | 1.76 | 0.029 | 0.014 | 0.0017 | 0.0034 | — | — | — | — | — | — | — | — | — | — | Example |
| C | 0.113 | 1.36 | 1.96 | 0.032 | 0.020 | 0.0021 | 0.0038 | — | — | — | — | — | — | — | — | — | — | Example |
| D | 0.078 | 1.47 | 2.66 | 0.030 | 0.013 | 0.0020 | 0.0032 | — | — | — | — | — | — | — | — | — | — | Example |
| E | 0.086 | 1.38 | 1.38 | 0.031 | 0.018 | 0.0019 | 0.0035 | — | — | 0.19 | — | — | — | — | — | — | — | Example |
| F | 0.096 | 1.34 | 1.52 | 0.026 | 0.012 | 0.0018 | 0.0031 | — | — | — | 0.058 | — | — | — | — | — | — | Example |
| G | 0.090 | 1.41 | 1.34 | 0.030 | 0.013 | 0.0024 | 0.0030 | — | — | — | — | 0.12 | — | — | — | — | — | Example |
| H | 0.085 | 1.52 | 1.38 | 0.026 | 0.008 | 0.0019 | 0.0032 | — | — | — | — | — | 0.024 | — | — | — | — | Example |
| I | 0.089 | 1.46 | 1.39 | 0.029 | 0.011 | 0.0026 | 0.0029 | — | — | — | — | — | — | 0.022 | 0.002 | — | — | Example |
| J | 0.073 | 1.32 | 1.51 | 0.030 | 0.013 | 0.0023 | 0.0036 | 0.22 | 0.16 | — | — | — | — | — | — | — | — | Example |
| K | 0.093 | 1.46 | 1.55 | 0.026 | 0.009 | 0.0023 | 0.0031 | — | — | — | — | — | — | — | — | 0.002 | 0.001 | Example |
| L | 0.013 | 1.24 | 1.62 | 0.034 | 0.022 | 0.0022 | 0.0033 | — | — | — | — | — | — | — | — | — | — | Comparative Example |
| M | 0.092 | 0.31 | 1.98 | 0.030 | 0.019 | 0.0024 | 0.0031 | — | — | — | — | — | — | — | — | — | — | Comparative Example |
| N | 0.086 | 0.99 | 3.02 | 0.028 | 0.016 | 0.0019 | 0.0033 | — | — | — | — | — | — | — | — | — | — | Comparative Example |

Under line: indicates a value out of range according to the present invitation

TABLE 2

| No. | Steel Grade | Finish Rolling Delivery Temperature ° C. | Mean Cooling Rate from Finish Rolling Delivery Temperature to 650° C. (° C./s) | Mean Cooling Rate from 650° C. to Coiling Temperature (° C./s) | Coiling Temperature ° C. | Note |
|---|---|---|---|---|---|---|
| 1 | A | 890 | 36.5 | 18.0 | 560 | Example |
| 2 | A | 890 | 40.5 | 20.0 | 530 | Example |
| 3 | A | 890 | 45.5 | 16.0 | 550 | Example |
| 4 | A | 890 | 42.5 | 22.0 | 540 | Example |
| 5 | A | 890 | 32.5 | 15.0 | 580 | Example |
| 6 | A | 890 | 38.5 | 18.0 | 520 | Example |
| 7 | B | 900 | 40.5 | 20.0 | 550 | Example |
| 8 | C | 890 | 45.5 | 15.0 | 540 | Example |
| 9 | A | 890 | 35.5 | 12.0 | 550 | Example |
| 10 | B | 880 | 34.5 | 18.0 | 550 | Example |
| 11 | B | 880 | 45.5 | 22.0 | 560 | Example |
| 12 | B | 880 | 55.5 | 21.0 | 560 | Example |
| 13 | C | 880 | 60.5 | 12.0 | 540 | Example |
| 14 | C | 880 | 55.5 | 15.0 | 540 | Example |
| 15 | C | 880 | 33.5 | 16.0 | 540 | Example |
| 16 | D | 870 | 31.5 | 20.0 | 570 | Example |
| 17 | D | 870 | 40.5 | 20.0 | 570 | Example |
| 18 | D | 870 | 55.5 | 18.0 | 570 | Example |
| 19 | A | 800 | 35.5 | 20.0 | 560 | Comparative Example |
| 20 | A | 890 | 150.0 | 18.0 | 550 | Comparative Example |
| 21 | A | 890 | 10.0 | 16.0 | 560 | Comparative Example |
| 22 | A | 890 | 36.5 | 50.0 | 530 | Comparative Example |
| 23 | A | 890 | 45.5 | 20.0 | 750 | Comparative Example |
| 24 | A | 890 | 50.5 | 18.0 | 400 | Comparative Example |
| 25 | A | 890 | 60.5 | 18.0 | 560 | Example |
| 26 | E | 890 | 55.5 | 12.0 | 520 | Example |
| 27 | F | 890 | 34.5 | 14.0 | 580 | Example |
| 28 | G | 890 | 45.5 | 20.0 | 570 | Example |
| 29 | H | 890 | 30.5 | 18.0 | 560 | Example |
| 30 | I | 890 | 30.5 | 16.0 | 550 | Example |
| 31 | J | 890 | 65.5 | 20.0 | 580 | Example |

TABLE 2-continued

| No. | Steel Grade | Finish Rolling Delivery Temperature ° C. | Mean Cooling Rate from Finish Rolling Delivery Temperature to 650° C. (° C./s) | Mean Cooling Rate from 650° C. to Coiling Temperature (° C./s) | Coiling Temperature ° C. | Note |
|---|---|---|---|---|---|---|
| 32 | K | 890 | 40.5 | 22.0 | 550 | Example |
| 33 | L | 890 | 40.5 | 22.0 | 560 | Comparative Example |
| 34 | M | 890 | 35.5 | 19.0 | 520 | Comparative Example |
| 35 | N | 890 | 36.5 | 20.0 | 550 | Comparative Example |

Under line: indicates a value out of range according to the present invitation

Each of the area ratios of ferrite and pearlite of the obtained hot rolled steel sheets was derived by calculating the average of ten values of area ratios of each phase (ferrite or pearlite) which were calculated using Image-Pro, produced by Media Cybernetics, Inc., from the microstructure photographs which were taken using a SEM (scanning electron microscope) at a magnification of 2000 times in 10 microscopic fields of a position at ¼ of thickness (position located at ¼ of the thickness of the steel sheet from the surface of the steel sheet) of each sample which was prepared by polishing and etching, using a 3% nital solution, a cross section in the thickness direction which was parallel to the rolling direction of the steel sheet. In the microstructure photograph, ferrite is observed as a gray microstructure (base microstructure), and pearlite is observed as a layered microstructure of ferrite and cementite (white). Each of the mean grain sizes of ferrite and pearlite was derived as the average value of the equivalent circle diameters which were calculated from the areas of the grains of ferrite and pearlite which were obtained using Image-Pro described above. The mean free path of pearlite was derived using equation (1) below on the assumption that there was not a significant eccentricity in the distribution of pearlite grains as indicated by the coordinates (X-coordinate and Y-coordinate) of the barycenter of the pearlite grains which was obtained using Image-Pro described above. The remainder of the microstructure other than ferrite and pearlite was any of oxides such as cementite and martensite, bainitic ferrite and retained austenite.

$$L_M = (d_M/2)(4\pi/3f)^{1/3} \quad \text{(equation 1)}$$

Here,
$L_M$: the mean free path of a pearlite (μm)
$d_M$: the mean grain size of a pearlite (μm)
f: the area ratio of a pearlite (%)/100.

Tensile tests were carried out using the obtained cold steel sheets (CR), galvanized steel sheets (GI), and galvannealed steel sheets (GA). The tensile test was carried out using a JIS No. 5 tensile test piece, which was cut out of the steel sheet so that the tensile direction was at a right angle to the rolling direction of the steel sheet, in accordance with JIS Z 2241 (2010), and TS (tensile strength) and EL (total elongation) were determined. Ductility was evaluated using the value of TS×EL. Here, a case where the relationship TS×EL≥19000 MPa·% was satisfied was judged as satisfactory in the present invention.

The TS, yield stress (YP) and EL of the center and the position at ⅛ of width of the hot rolled steel sheet were determined by carrying out a tensile test using a JIS No. 5 test piece (with a tensile direction being at a right angle to the rolling direction) in the similar way as described above, and the differences in these values between the center of the width and the position at ⅛ of width (value for the center of the width−value for the position at ⅛ of width) were calculated and respectively represented by ΔTS, ΔYP, and ΔEL. Here, a case where the differences in these values between the center of the width and the position at ⅛ of width of the hot rolled steel sheet satisfy the relationships ΔTS=30 MPa, ΔYP≤40 MPa, and ΔEL≤4.0% was judged as a case where the stability of material quality is satisfactory in the present, invention.

In addition, the TS, yield stress (YP), and EL of the center and the position at ⅛ of width of the annealed steel sheet were determined, and the differences in these values between the center of the width and the position at ⅛ of width (value for the center of the width−value for the position at ⅛ of width) were calculated and respectively represented by ΔTS, ΔYP, and ΔEL. Here, a case where the differences in these values between the center of the width and the position at ⅛ of width of the annealed steel sheet satisfy the relationships ΔTS≤25 MPa, ΔYP≤35 MPa, and ΔEL≤3.5% was judged as a case where the stability of material quality is satisfactory in the present invention.

The results derived as described above are given in Tables 3 and 4.

TABLE 3

| No. | Steel Grade | Thickness of Hot Rolled Sheet (mm) | Final Thickness (mm) | Area Ratio of F (%) | Area Ratio of P (%) | Mean Grain Size of F (μm) | Mean Grain Size of P (μm) | Mean Free Path of P (μm) | Remainder of Microstructure | Note |
|---|---|---|---|---|---|---|---|---|---|---|
| 1 | A | 3.2 | 1.4 | 89 | 9 | 12.1 | 6.2 | 11.1 | BF, θ | Example |
| 2 | A | 3.2 | 1.4 | 90 | 8 | 11.4 | 5.6 | 10.5 | BF, θ | Example |
| 3 | A | 3.2 | 1.4 | 88 | 10 | 11.7 | 5.1 | 8.9 | BF, θ | Example |
| 4 | A | 2.3 | 0.8 | 89 | 9 | 10.1 | 4.2 | 7.6 | BF, θ | Example |
| 5 | A | 4.5 | 2.3 | 91 | 8 | 13.4 | 6.8 | 12.7 | BF, θ | Example |
| 6 | A | 3.2 | 3.2 | 91 | 8 | 11.4 | 5.4 | 10.1 | BF, θ | Example |
| 7 | B | 2.8 | 2.8 | 86 | 12 | 11.8 | 5.1 | 8.3 | BF, θ | Example |

TABLE 3-continued

| No. | Steel Grade | Thickness of Hot Rolled Sheet (mm) | Final Thickness (mm) | Area Ratio of F (%) | Area Ratio of P (%) | Mean Grain Size of F (μm) | Mean Grain Size of P (μm) | Mean Free Path of P (μm) | Remainder of Microstructure | Note |
|---|---|---|---|---|---|---|---|---|---|---|
| 8  | C | 2.6 | 2.6 | 83 | 16 | 10.1 | 4.8 | 7.1 | BF, θ | Example |
| 9  | A | 3.2 | 3.2 | 87 | 11 | 12.4 | 4.9 | 8.2 | BF, θ | Example |
| 10 | B | 3.2 | 1.4 | 85 | 13 | 10.6 | 4.6 | 7.3 | BF, θ | Example |
| 11 | B | 3.2 | 1.4 | 86 | 12 | 10.2 | 4.4 | 7.2 | BF, θ | Example |
| 12 | B | 3.2 | 1.4 | 87 | 11 | 11.4 | 4.7 | 7.9 | BF, θ | Example |
| 13 | C | 3.2 | 1.4 | 82 | 17 | 9.5  | 4.6 | 6.7 | BF, M, RA, θ | Example |
| 14 | C | 3.2 | 1.4 | 83 | 16 | 9.4  | 4.2 | 6.2 | BF, M, RA, θ | Example |
| 15 | C | 3.2 | 1.4 | 82 | 17 | 9.2  | 4.1 | 6.0 | BF, M, RA, θ | Example |
| 16 | D | 3.2 | 1.4 | 80 | 18 | 8.4  | 4.6 | 6.6 | BF, M, RA, θ | Example |
| 17 | D | 3.2 | 1.4 | 79 | 19 | 8.6  | 4.8 | 6.7 | BF, M, RA, θ | Example |
| 18 | D | 3.2 | 1.4 | 78 | 19 | 8.2  | 4.7 | 6.6 | BF, M, RA, θ | Example |
| 19 | A | 3.2 | 1.4 | 84 | 10 | 10.2 | <u>1.6</u> | <u>2.8</u> | BF, θ | Comparative Example |
| 20 | A | 3.2 | 1.4 | 77 | 11 | <u>3.1</u> | 2.4 | <u>4.0</u> | BF, M, RA, θ | Comparative Example |
| 21 | A | 3.2 | 1.4 | 94 | <u>3</u> | 10.4 | 3.6 | 9.3 | BF, θ | Comparative Example |
| 22 | A | 3.2 | 1.4 | 88 | <u>2</u> | 11.4 | <u>1.8</u> | 5.3 | BF, M, RA, θ | Comparative Example |
| 23 | A | 3.2 | 1.4 | 88 | 9 | <u>28.2</u> | 5.8 | 10.4 | BF, θ | Comparative Example |
| 24 | A | 3.2 | 1.4 | 84 | <u>3</u> | 11.5 | 3.8 | 9.9 | BF, M, RA, θ | Comparative Example |
| 25 | A | 3.2 | 1.4 | 88 | 9 | 12.1 | 5.4 | 9.7 | BF, θ | Example |
| 26 | E | 3.2 | 1.4 | 90 | 9 | 12.7 | 5.8 | 10.4 | BF, θ | Example |
| 27 | F | 3.2 | 1.4 | 88 | 10 | 12.2 | 5.9 | 10.2 | BF, θ | Example |
| 28 | G | 3.2 | 1.4 | 89 | 9 | 11.4 | 6.2 | 11.1 | BF, θ | Example |
| 29 | H | 3.2 | 1.4 | 90 | 9 | 12.6 | 6.2 | 11.1 | BF, θ | Example |
| 30 | I | 3.2 | 1.4 | 87 | 11 | 13.4 | 5.1 | 8.6 | BF, θ | Example |
| 31 | J | 3.2 | 1.4 | 88 | 10 | 13.8 | 5.4 | 9.4 | BF, θ | Example |
| 32 | K | 3.2 | 1.4 | 89 | 9 | 12.8 | 5.3 | 9.5 | BF, θ | Example |
| 33 | L | 3.2 | 1.4 | 96 | <u>1</u> | 12.0 | <u>1.7</u> | 6.4 | BF, θ | Comparative Example |
| 34 | M | 3.2 | 1.4 | <u>72</u> | 12 | <u>4.2</u> | 2.4 | <u>3.9</u> | BF, M, RA, θ | Comparative Example |
| 35 | N | 3.2 | 1.4 | <u>72</u> | <u>2</u> | <u>4.1</u> | 1.8 | 5.3 | BF, M, RA, θ | Comparative Example |

Under line: indicates a value out of range according to the present invention
F: ferrite, P: pearlite, BF: bainitic ferrite, M: martensite, RA: retained a austenite, θ: carbides such as cementite
CR: cold rolled steel sheet, GI: galvanized steel sheet, GA: galvannealed steel sheet

TABLE 4

| No. | Steel Grade | TS of Annealed Sheet (MPa) | EL of Annealed Sheet (%) | TS × EL of Annealed Sheet (MPa · %) | Difference between Center and Position at 1/8 of Width of hot rolled Sheet | | | Difference between Center and Position at 1/8 of Width of Annealed Sheet | | | Steel Type | Note |
|---|---|---|---|---|---|---|---|---|---|---|---|---|
| | | | | | ΔTS (MPa) | ΔYP (MPa) | ΔEL (%) | ΔTS (MPa) | ΔYP (MPa) | ΔEL (%) | | |
| 1  | A | 624  | 33.1 | 20654 | 10 | 18 | 2.4 | 7  | 12 | 1.8 | CR | Example |
| 2  | A | 628  | 32.6 | 20473 | 11 | 19 | 2.8 | 7  | 12 | 2.0 | GI | Example |
| 3  | A | 609  | 33.2 | 20219 | 8  | 17 | 2.2 | 6  | 11 | 1.8 | GA | Example |
| 4  | A | 632  | 32.1 | 20287 | 13 | 16 | 2.0 | 9  | 14 | 1.6 | GA | Example |
| 5  | A | 607  | 37.2 | 22580 | 8  | 13 | 2.2 | 6  | 11 | 2.0 | GA | Example |
| 6  | A | 617  | 32.8 | 20238 | 10 | 14 | 2.4 | 8  | 13 | 2.2 | GA | Example |
| 7  | B | 612  | 33.4 | 20441 | 14 | 16 | 2.2 | 15 | 16 | 2.0 | GA | Example |
| 8  | C | 798  | 26.7 | 21307 | 19 | 20 | 2.4 | 18 | 21 | 2.2 | GA | Example |
| 9  | A | 610  | 33.4 | 20374 | 10 | 17 | 2.2 | 11 | 18 | 2.0 | GI | Example |
| 10 | B | 622  | 33.2 | 20650 | 15 | 16 | 2.2 | 11 | 16 | 1.4 | CR | Example |
| 11 | B | 618  | 33.1 | 20456 | 14 | 14 | 2.2 | 10 | 15 | 1.6 | GI | Example |
| 12 | B | 603  | 33.4 | 20140 | 13 | 13 | 2.4 | 10 | 15 | 1.4 | GA | Example |
| 13 | C | 808  | 25.8 | 20846 | 18 | 19 | 2.4 | 15 | 20 | 1.6 | CR | Example |
| 14 | C | 806  | 25.4 | 20472 | 17 | 19 | 2.6 | 16 | 21 | 1.9 | GI | Example |
| 15 | C | 786  | 26.4 | 20750 | 19 | 18 | 2.6 | 12 | 17 | 1.8 | GA | Example |
| 16 | D | 1012 | 19.1 | 19329 | 22 | 20 | 2.4 | 20 | 25 | 1.7 | CR | Example |

TABLE 4-continued

| Steel No. | Steel Grade | TS of Annealed Sheet (MPa) | EL of Annealed Sheet (%) | TS × EL of Annealed Sheet (MPa·%) | Difference between Center and Position at 1/8 of Width of hot rolled Sheet | | | Difference between Center and Position at 1/8 of Width of Annealed Sheet | | | Steel Type | Note |
|---|---|---|---|---|---|---|---|---|---|---|---|---|
| | | | | | ΔTS (MPa) | ΔYP (MPa) | ΔEL (%) | ΔTS (MPa) | ΔYP (MPa) | ΔEL (%) | | |
| 17 | D | 1008 | 19.4 | 19555 | 23 | 22 | 2.4 | 21 | 26 | 1.5 | GI | Example |
| 18 | D | 992 | 20.3 | 20138 | 21 | 20 | 2.0 | 20 | 25 | 1.9 | GA | Example |
| 19 | A | 602 | 26.8 | <u>16134</u> | <u>38</u> | <u>48</u> | <u>4.4</u> | <u>31</u> | <u>41</u> | <u>3.8</u> | GA | Comparative Example |
| 20 | A | 607 | 26.9 | <u>16328</u> | <u>42</u> | <u>46</u> | <u>4.6</u> | <u>34</u> | <u>44</u> | <u>3.7</u> | GI | Comparative Example |
| 21 | A | 608 | 26.3 | <u>15990</u> | 22 | 29 | 3.2 | 14 | 22 | 2.2 | GI | Comparative Example |
| 22 | A | 614 | 26.7 | <u>16394</u> | 23 | 28 | 3.3 | 15 | 23 | 2.1 | GA | Comparative Example |
| 23 | A | <u>521</u> | 33.7 | <u>17558</u> | 24 | 31 | 3.1 | 18 | 28 | 2.0 | CR | Comparative Example |
| 24 | A | 648 | 30.1 | 19505 | <u>41</u> | <u>47</u> | <u>4.6</u> | <u>31</u> | <u>41</u> | <u>3.7</u> | GA | Comparative Example |
| 25 | A | 630 | 32.4 | 20412 | 10 | 13 | 1.8 | 6 | 11 | 2.0 | GI | Example |
| 26 | E | 618 | 33.1 | 20456 | 10 | 15 | 2.4 | 7 | 12 | 1.8 | CR | Example |
| 27 | F | 620 | 33.2 | 20584 | 9 | 15 | 2.6 | 7 | 12 | 1.7 | GI | Example |
| 28 | G | 614 | 33.4 | 20508 | 11 | 13 | 2.4 | 6 | 11 | 1.5 | GA | Example |
| 29 | H | 610 | 33.0 | 20130 | 11 | 13 | 2.2 | 7 | 12 | 1.4 | CR | Example |
| 30 | I | 613 | 33.4 | 20474 | 10 | 12 | 2.0 | 6 | 11 | 1.2 | GI | Example |
| 31 | J | 614 | 33.7 | 20692 | 10 | 14 | 2.2 | 8 | 13 | 1.6 | GA | Example |
| 32 | K | 619 | 33.8 | 20922 | 9 | 13 | 2.2 | 9 | 14 | 1.8 | CR | Example |
| 33 | L | <u>502</u> | 32.4 | <u>16265</u> | 22 | 24 | 2.8 | 10 | 15 | 2.6 | CR | Comparative Example |
| 34 | M | 605 | 27.4 | <u>16577</u> | <u>44</u> | <u>43</u> | <u>4.6</u> | <u>32</u> | <u>41</u> | <u>3.9</u> | GI | Comparative Example |
| 35 | N | 762 | 25.1 | 19126 | <u>52</u> | <u>50</u> | <u>4.4</u> | <u>41</u> | <u>46</u> | <u>4.0</u> | GA | Comparative Example |

In the case of the examples of the present invention, the hot rolled steel sheets for a cold rolled steel sheet and the hot rolled steel sheets for a galvanized steel sheet had a TS of 540 MPa or more after the following annealing had been performed and were excellent in terms of ductility and stability of material quality. On the other hand, the comparative examples were poor in one or more of strength, ductility, and stability of material quality.

According to the present invention, a hot rolled steel sheet for a cold rolled steel sheet end a hot rolled steel sheet for a galvanized steel sheet excellent in terms of formability and stability of material quality can be obtained. A cold rolled steel sheet and a galvanized steel sheet which are produced from the hot rolled steel sheet according to the present invention can be applied, for example, to the structural parts of automobiles.

What is claimed:

1. A method for producing a hot rolled steel sheet for cold rolling, the method comprising:
   hot rolling a steel slab having a chemical composition containing, by mass %, C: 0.04% or more and 0.20% or less, Si: 0.7% or more and 2.3% or less, Mn: 0.8% or more and 2.8% or less, P: 0.1% or less, S: 0.01% or less, Al: 0.1% or less, N: 0.008% or less, and the balance being Fe and inevitable impurities under the condition that a finish rolling delivery temperature is 850° C. or higher;
   cooling the hot rolled steel sheet at a first mean cooling rate of 20° C./s to 45.5° C./s in a temperature range from the finish rolling delivery temperature to 650° C.;
   subsequently, further cooling the hot rolled steel sheet at a second mean cooling rate of 5° C./s to 35° C./s in a temperature range from 650° C. down to a coiling temperature; and
   coiling the cooled steel sheet at a temperature of 470° C. to 640° C.;
   wherein the first mean cooling rate is higher than the second mean cooling rate, and
   wherein an area ratio of a microstructure of the cooled steel sheet includes 75% or more and less than 95% of ferrite.

2. The method for producing a hot rolled steel sheet for cold rolling according to claim 1, wherein the steel slab further contains, by mass %, at least one element selected from the group consisting of Cr: 0.05% or more and 1.0% or less, V: 0.005% or more and 0.5% or less, Mo: 0.005% or more and 0.5% or less, Ni: 0.05% or more and 1.0% or less, and Cu: 0.05% or more and 1.0% or less.

3. The method for producing a hot rolled steel sheet for cold rolling according to claim 1, wherein the steel slab further contains, by mass %, at least one element selected from the group consisting of Ti: 0.01% or more and 0.1% or less, Nb: 0.01% or more and 0.1% or less, and B: 0.0003% or more and 0.0050% or less.

4. The method for producing a hot rolled steel sheet for cold rolling according to claim 1, wherein the steel slab further contains, by mass %, at least one element selected from the group consisting of Ca: 0.001% or more and 0.005% or less and REM: 0.001% or more and 0.005% or less.

5. The method for producing a hot rolled steel sheet for cold rolling according to claim 3, wherein the steel slab further contains, by mass %, at least one element selected from the group consisting of Ca: 0.001% or more and 0.005% or less and REM: 0.001% or more and 0.005% or less.

6. A method for producing a hot rolled steel sheet for galvanizing, the method comprising:

hot rolling a steel slab having a chemical composition containing, by mass %, C: 0.04% or more and 0.20% or less, Si: 0.7% or more and 2.3% or less, Mn: 0.8% or more and 2.8% or less, P: 0.1% or less, S: 0.01% or less, Al: 0.1% or less, N: 0.008% or less, and the balance being Fe and inevitable impurities under the condition that a finish rolling delivery temperature is 850° C. or higher;

cooling the hot rolled steel sheet at a first mean cooling rate of 20° C./s to 45.5° C./s in a temperature range from the finish rolling delivery temperature to 650° C.;

subsequently, further cooling the hot rolled steel sheet at a second mean cooling rate of 5° C./s to 35° C./s in a temperature range from 650° C. down to a coiling temperature; and coiling the cooled steel sheet at a temperature of 470° C. to 640° C.;

wherein the first mean cooling rate is higher than the second mean cooling rate, and wherein an area ratio of a microstructure of the cooled steel sheet includes 75% or more and less than 95% of ferrite.

7. The method for producing a hot rolled steel sheet for galvanizing according to claim 6, wherein the steel slab further contains, by mass %, at least one element selected from the group consisting of Cr: 0.05% or more and 1.0% or less, V: 0.005% or more and 0.5% or less, Mo: 0.005% or more and 0.5% or less, Ni: 0.05% or more and 1.0% or less, and Cu: 0.05% or more and 1.0% or less.

8. The method for producing a hot rolled steel sheet for galvanizing according to claim 6, wherein the steel slab further contains, by mass %, at least one element selected from the group consisting of Ti: 0.01% or more and 0.1% or less, Nb: 0.01% or more and 0.1% or less, and B: 0.0003% or more and 0.0050% or less.

9. The method for producing a hot rolled steel sheet for galvanizing according to claim 6, wherein the steel slab further contains, by mass %, at least one element selected from the group consisting of Ca: 0.001% or more and 0.005% or less and REM: 0.001% or more and 0.005% or less.

10. The method for producing a hot rolled steel sheet for galvanizing according to claim 8, wherein the steel slab further contains, by mass %, at least one element selected from the group consisting of Ca: 0.001% or more and 0.005% or less and REM: 0.001% or more and 0.005% or less.

11. The method for producing a hot rolled steel sheet for cold rolling according to claim 2, wherein the steel slab further contains, by mass %, at least one element selected from the group consisting of Ti: 0.01% or more and 0.1% or less, Nb: 0.01% or more and 0.1% or less, and B: 0.0003% or more and 0.0050% or less.

12. The method for producing a hot rolled steel sheet for cold rolling according to claim 2, wherein the steel slab further contains, by mass %, at least one element selected from the group consisting of Ca: 0.001% or more and 0.005% or less and REM: 0.001% or more and 0.005% or less.

13. The method for producing a hot rolled steel sheet for cold rolling according to claim 11, wherein the steel slab further contains, by mass %, at least one element selected from the group consisting of Ca: 0.001% or more and 0.005% or less and REM: 0.001% or more and 0.005% or less.

14. The method for producing a hot rolled steel sheet for galvanizing according to claim 7, wherein the steel slab further contains, by mass %, at least one element selected from the group consisting of Ti: 0.01% or more and 0.1% or less, Nb: 0.01% or more and 0.1% or less, and B: 0.0003% or more and 0.0050% or less.

15. The method for producing a hot rolled steel sheet for galvanizing according to claim 7, wherein the steel slab further contains, by mass %, at least one element selected from the group consisting of Ca: 0.001% or more and 0.005% or less and REM: 0.001% or more and 0.005% or less.

16. The method for producing a hot rolled steel sheet for galvanizing according to claim 14, wherein the steel slab further contains, by mass %, at least one element selected from the group consisting of Ca: 0.001% or more and 0.005% or less and REM: 0.001% or more and 0.005% or less.

17. The method for producing a hot rolled steel sheet for cold rolling according to claim 1, wherein the chemical composition contains, by mass %, C: 0.04% or more and 0.093% or less.

* * * * *